No. 730,669. PATENTED JUNE 9, 1903.
L. B. LOTZ.
CANE FORK.
APPLICATION FILED FEB. 18, 1903.
NO MODEL.
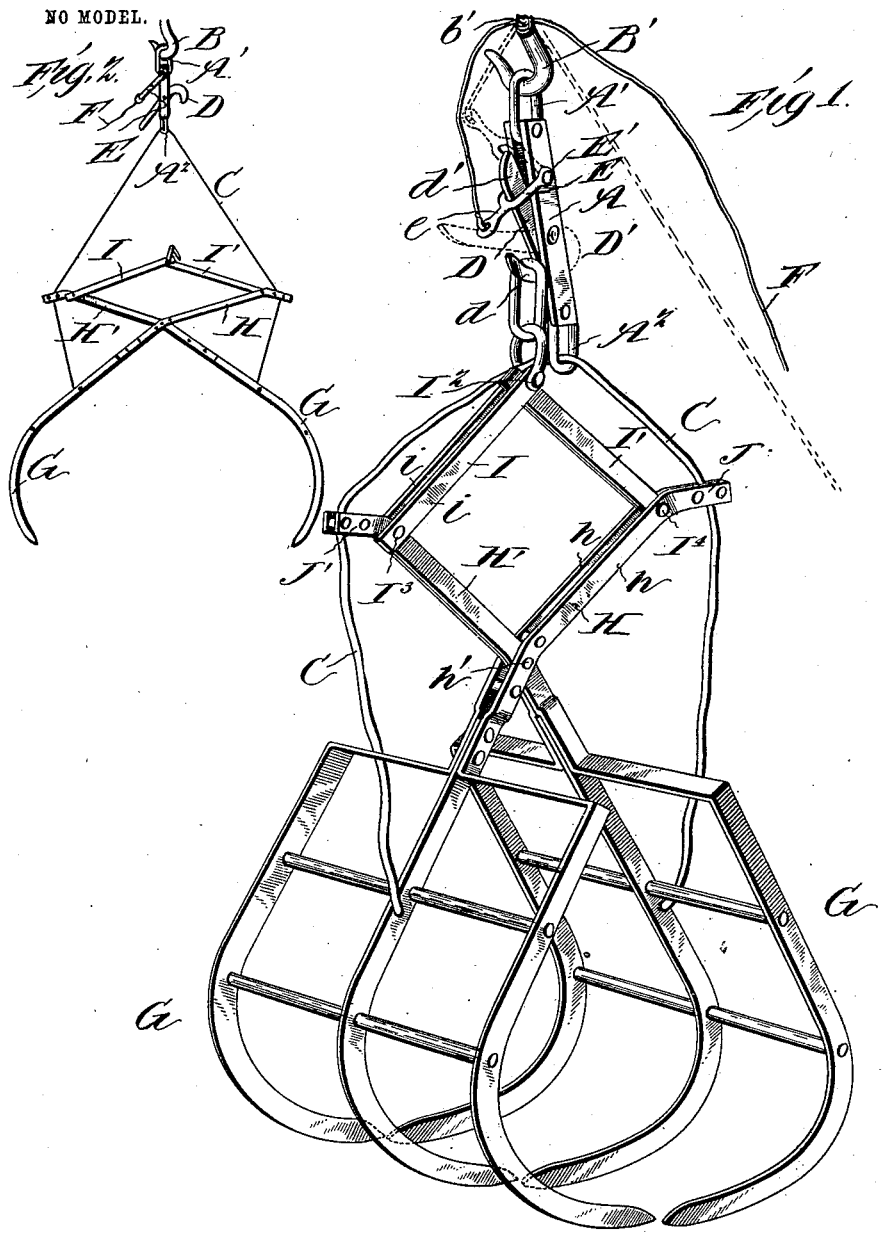
WITNESSES:
Geo. P. Kingsbury
Perry B. Turpin
INVENTOR
Leonhard B. Lotz.
BY Munn & Co.
ATTORNEYS.

No. 730,669.

Patented June 9, 1903.

UNITED STATES PATENT OFFICE.

LEONHARD B. LOTZ, OF PLAQUEMINE, LOUISIANA.

CANE-FORK.

SPECIFICATION forming part of Letters Patent No. 730,669, dated June 9, 1903.

Application filed February 18, 1903. Serial No. 143,983. (No model.)

*To all whom it may concern:*

Be it known that I, LEONHARD B. LOTZ, a citizen of the United States, residing at Plaquemine, in the parish of Iberville and State of Louisiana, have made certain new and useful Improvements in Cane-Forks, of which the following is a specification.

My invention is an improvement in forks, and especially in forks for use in handling canes, such as sugar-cane; and the invention consists in certain novel constructions and combinations of parts, as will be hereinafter described and claimed.

In the drawings, Figure 1 is a perspective view of the fork closed as in use in hoisting and carrying cane, and Fig. 2 is a side view of the fork open.

In the construction shown I employ a head-block A, provided with a link A', which may be connected with a hook B', carried by the fall-rope. The block A includes the opposite side plates connected together and spaced apart to receive between their upper ends the link A' and between their lower ends the link $A^2$, the latter receiving the spreading-line C, by which the fork is opened in the use of the device.

The carrying-hook D is pivoted at D' between the side plates of the head-block and has at its lower end the hook $d$ for supporting the fork and is also provided with the upwardly-projecting arm $d'$ for engagement by the locking-bail E, which has its opposite arms pivoted at E' to the opposite sides of the head-block and is arranged to swing over and retain the arm $d'$ when the fork is closed, as shown in Fig. 1, and for adjustment to the dotted-line position shown in Fig. 1 to release the carrying-hook and permit the same to adjust to the dotted-line position shown in Fig. 1, so the fork will drop off to the position shown in Fig. 2. This locking-bail E has the outwardly-projecting arm $e$, to which is connected the tripping rope or line F, which extends thence upwardly through a guide $b'$ in the book B'. By this line F the locking-bail E may be operated to release the carrying-hook D, as will be understood from Figs. 1 and 2 of the drawings. The fork comprises the tine-frames G, having at their upper ends the handles H and H'. The handle H is doubled or composed of the opposite side plates $h$, and the handle H' is pivoted to the handle H at $h'$ between the plates $h$ of the handle H. The links I and I' are connected at their upper ends at $I^2$ with the devices by which the fork is suspended from the carrying-hook D, and these links are pivoted at their lower ends at $I^3$ and $I^4$ to the handles H' and H. It will be noticed the link I is doubled or composed of the opposite side plates $i$, and this double link is connected with the single handle H', while the single link I' is connected with the double handle H and between the side plates $h$ thereof. The handles H and H' have extensions J and J' beyond the connections at $I^3$ and $I^4$ of the links with said handles, such extensions J and J' being provided with guides for the spreading-line C, which line is connected with the bottom link $A^2$ of the head-block A and extends thence through the guides in the extensions J and J' and connects at its ends with the tine-frames G, as shown.

In the operation of the described construction, if the parts be as shown in full lines, Fig. 1, and the tripping-line F be drawn upon, it will lift the bail E out of engagement with the carrying-hook D, thus releasing said hook, which will swing by the weight of the fork and its contents to the dotted-line position shown in Fig. 1 and release the fork, which will drop by gravity to the position shown in Fig. 2, the spreading-line C operating to spread the tine-frames G from the position shown in Fig. 1 to that shown in Fig. 2, thus discharging the cane or other material from the fork. It is then only necessary to lower the fork to the supply of cane, engage it therewith, and readjust the parts to the locked position, (shown in Fig. 1,) when the operation may be proceeded with as before.

The construction is simple, strong, easily and certainly operated, and possesses no parts likely to get out of order.

Having thus described my invention, what I claim as new, and desire to secure by Letters Patent, is—

1. The improvement in cane-forks herein described, comprising the fork having the tine-frames and provided at the upper ends thereof with the pivoted crossed handles, one of said handles consisting of the pair of side plates spaced apart and the other or single handle operating between the doubled handle, the links connected at their lower ends with the handles above the pivot and pivotally connected at their upper ends, said links being made one double and the other single, the double link being connected with the single fork-handle and the single link with the doubled fork-handle, and the head-block for supporting the fork and provided with a carrying-hook, and a locking-bail for said hook, the fork-handles being extended beyond their connection with the links and provided in such extensions with guides for the spreading-line, and the spreading-line, substantially as set forth.

2. The combination of the head-block having means for suspending the fork, the fork comprising the tine-sections having the handles at their upper ends pivoted together and extended beyond the pivot, the links connected at their lower ends with the handles and at their upper ends with devices for suspension from the head-block, the fork-handles being provided with extensions beyond the connections of the links therewith and having such extensions provided with guides for the spreading-line, and the spreading-line connected with the head-block and passed thence through the guides in the handle extensions and connected at its ends with the opposite tine-frames whereby to spread the same when the fork is released from the head-block, substantially as set forth.

3. In a cane-fork the combination with the spreading fork, of a head-block for carrying said fork, said head-block being composed of the opposite side plates, the links held to the block between said side plates at its upper and lower ends, and adapted to receive the suspending devices and the spreading device for the block, the carrying-hook pivoted between the side plates of the head-block and having at its upper end the hook for carrying the fork and provided with the upwardly-projecting arm operating between the side plates of the head-block and arranged for engagement by the locking-bail, and the locking-bail pivoted to the outer sides of the head-block and movable downward over the carrying-hook to secure the same, and upwardly from such position to release the carrying-hook to permit the fork to drop to opened position, substantially as set forth.

LEONHARD B. LOTZ.

Witnesses:
  HY. BEMUD,
  JAS. M. RHOE, Jr.